(12) United States Patent
Takamatsu et al.

(10) Patent No.: US 12,314,940 B2
(45) Date of Patent: *May 27, 2025

(54) CURRENCY MANAGEMENT SYSTEM AND ELECTRONIC SIGNATURE DEVICE

(71) Applicant: GVE Ltd., Tokyo (JP)

(72) Inventors: Keita Takamatsu, Tokyo (JP); Koji Fusa, Tokyo (JP); Yu Kusakabe, Tokyo (JP)

(73) Assignee: GVE Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,686

(22) Filed: Oct. 5, 2023

(65) Prior Publication Data

US 2024/0029063 A1  Jan. 25, 2024

Related U.S. Application Data

(63) Continuation of application No. 17/922,480, filed as application No. PCT/JP2020/044576 on Dec. 1, 2020, now Pat. No. 11,816,663.

(51) Int. Cl.
*G06Q 20/38* (2012.01)

(52) U.S. Cl.
CPC .............................. *G06Q 20/3825* (2013.01)

(58) Field of Classification Search
None
See application file for complete search history.

(56) References Cited

U.S. PATENT DOCUMENTS 10,581,841 B2 * 3/2020 Watanabe ............. H04L 9/3239
11,356,427 B1 * 6/2022 Griffin ................. H04L 63/045
(Continued)

FOREIGN PATENT DOCUMENTS

JP      6-231161 A     8/1994
JP     10-154193 A    6/1998
(Continued)

OTHER PUBLICATIONS

"Barker, Elaine, A Framework for Designing Cryptographic Key Management Systems, NIST Special Publication 800-130, Aug. 2013" (Year: 2013).*

(Continued)

*Primary Examiner* — Christopher Bridges
*Assistant Examiner* — Toan Duc Bui
(74) *Attorney, Agent, or Firm* — SQUIRE PATTON BOGGS (US) LLP

(57) ABSTRACT

A currency management system that excels in security and includes legal tender as a management target. A transaction information management device (TIMD) receives first transaction (Tr) information from a user terminal, and an account information management device receives second Tr information from the TIMD. The (TIMD) receives third Tr information from the account information management device, and a currency information management device receives fourth Tr information from the TIMD. The TIMD receives fifth Tr information from the currency information management device, and the TIMD sends sixth Tr information to a user terminal. The TIMD stores in the transaction information management device the first to sixth Tr information; and the account information management device and the currency information management device receive the first to sixth Tr information from the TIMD, and store the information in the account information management device and currency information management device respectively.

2 Claims, 7 Drawing Sheets

| BEFORE STORING | TRANSACTION INFORMATION ||||||
|---|---|---|---|---|---|---|
| | TRANSACTION NUMBER | TRANSACTION TYPE | REMITTANCE SOURCE ACCOUNT NUMBER | REMITTANCE DESTINATION ACCOUNT NUMBER | AMOUNT OF REMITTANCE | DATE/TIME |

| AFTER STORING | TRANSACTION INFORMATION ||||||
|---|---|---|---|---|---|---|
| | TRANSACTION NUMBER | TRANSACTION TYPE | REMITTANCE SOURCE ACCOUNT NUMBER | REMITTANCE DESTINATION ACCOUNT NUMBER | AMOUNT OF REMITTANCE | DATE/TIME |
| | 11 | REMITTANCE REQUEST | 1 | 2 | 500 | 2020/10/2 09:30:00 |
| | 12 | ACCOUNT INFORMATION CONFIRMATION REQUEST | 1 | 2 | 500 | 2020/10/2 09:30:00 |
| | 13 | ACCOUNT INFORMATION CONFIRMATION RESPONSE | | | | 2020/10/2 09:30:00 |
| | 14 | CURRENCY INFORMATION CONFIRMATION REQUEST | 1 | 2 | 500 | 2020/10/2 09:30:00 |
| | 15 | CURRENCY INFORMATION CONFIRMATION RESPONSE | | | | 2020/10/2 09:30:00 |
| | 16 | REMITTANCE RESPONSE | | | | 2020/10/2 09:30:00 |

(56) References Cited

U.S. PATENT DOCUMENTS

| | | | |
|---|---|---|---|
| 2011/0191161 A1* | 8/2011 | Dai | G06Q 20/40 |
| | | | 705/17 |
| 2012/0233078 A1 | 9/2012 | Oshima et al. | |
| 2013/0097078 A1* | 4/2013 | Wong | G06Q 20/10 |
| | | | 705/44 |
| 2016/0132864 A1* | 5/2016 | Barrese | G06Q 20/326 |
| | | | 382/190 |
| 2018/0117446 A1* | 5/2018 | Tran | G06F 1/163 |
| 2018/0270058 A1* | 9/2018 | Watanabe | G06F 21/602 |
| 2019/0020661 A1 | 1/2019 | Zhang | |
| 2019/0370898 A1 | 12/2019 | Kusakabe et al. | |
| 2021/0135856 A1* | 5/2021 | Adibi | H04L 9/0643 |

FOREIGN PATENT DOCUMENTS

| | | |
|---|---|---|
| JP | 10-255121 A | 9/1998 |
| JP | 2002-247031 A | 8/2002 |
| JP | 2003-281333 A | 10/2003 |
| JP | 2008-140298 A | 6/2008 |
| JP | 6316530 B1 | 4/2018 |
| JP | 2019-500799 A | 1/2019 |
| JP | 2020-35214 A | 3/2020 |
| WO | 2019/107000 A1 | 6/2019 |
| WO | 2019/111338 A1 | 6/2019 |

OTHER PUBLICATIONS

International Search Report and Written Opinion dated Mar. 9, 2021 corresponding to International Patent Application No. PCT/JP2020/044576, with English translation. No copy provided, per MPEP 609. Copy submitted in parent U.S. Appl. No. 17/922,480.

Decision to Grant a Patent dated Oct. 4, 2021 corresponding to Japanese Patent Application No. 2021-521544, with English translation thereof. No copy provided, per MPEP 609. Copy submitted in parent U.S. Appl. No. 17/922,480.

"Records Management Guidance for Agencies Implementing Electronic Signature Technologies", National Archives and Records Administration, Oct. 18, 2000. No copy provided, per MPEP 609. Copy submitted in parent U.S. Appl. No. 17/922,480.

International Search Report and Written Opinion dated Dec. 7, 2021 corresponding to International Patent Application No. PCT/JP2021/033437, with English translation thereof.

Extended European Search Report dated Jul. 17, 2024 issued in corresponding European Patent Application No. 20964212.3.

\* cited by examiner

| TRANSACTION INFORMATION ||||||
|---|---|---|---|---|---|
| TRANSACTION NUMBER | TRANSACTION TYPE | REMITTANCE SOURCE ACCOUNT NUMBER | REMITTANCE DESTINATION ACCOUNT NUMBER | AMOUNT OF REMITTANCE | DATE /TIME |

| ACCOUNT INFORMATION |||
|---|---|---|
| ACCOUNT NUMBER | BALANCE | LAST DATE/TIME UPDATE |

| CURRENCY INFORMATION | | | | |
|---|---|---|---|---|
| CURRENCY NUMBER | CURRENCY TYPE | CURRENCY VALUE | ACCOUNT NUMBER | LAST DATE/TIME UPDATE |

BEFORE STORING

| TRANSACTION INFORMATION | | | | | |
|---|---|---|---|---|---|
| TRANSACTION NUMBER | TRANSACTION TYPE | REMITTANCE SOURCE ACCOUNT NUMBER | REMITTANCE DESTINATION ACCOUNT NUMBER | AMOUNT OF REMITTANCE | DATE/TIME |

⇩

AFTER STORING

| TRANSACTION INFORMATION | | | | | |
|---|---|---|---|---|---|
| TRANSACTION NUMBER | TRANSACTION TYPE | REMITTANCE SOURCE ACCOUNT NUMBER | REMITTANCE DESTINATION ACCOUNT NUMBER | AMOUNT OF REMITTANCE | DATE/TIME |
| 11 | REMITTANCE REQUEST | 1 | 2 | 500 | 2020/10/2 09:30:00 |
| 12 | ACCOUNT INFORMATION CONFIRMATION REQUEST | 1 | 2 | 500 | 2020/10/2 09:30:00 |
| 13 | ACCOUNT INFORMATION CONFIRMATION RESPONSE | | | | 2020/10/2 09:30:00 |
| 14 | CURRENCY INFORMATION CONFIRMATION REQUEST | 1 | 2 | 500 | 2020/10/2 09:30:00 |
| 15 | CURRENCY INFORMATION CONFIRMATION RESPONSE | | | | 2020/10/2 09:30:00 |
| 16 | REMITTANCE RESPONSE | | | | 2020/10/2 09:30:00 |

FIG. 1F

BEFORE UPDATE

| ACCOUNT INFORMATION | | |
|---|---|---|
| ACCOUNT NUMBER | BALANCE | LAST DATE/TIME UPDATE |
| 1 | 1500 | 2020/10/1 03:15:00 |
| 2 | 0 | 2020/10/1 00:00:00 |

⇩

AFTER UPDATE

| ACCOUNT INFORMATION | | |
|---|---|---|
| ACCOUNT NUMBER | BALANCE | LAST DATE/TIME UPDATE |
| 1 | 1000 | 2020/10/2 09:30:00 |
| 2 | 500 | 2020/10/2 09:30:00 |

FIG. 1G

| CURRENCY INFORMATION | | | | |
|---|---|---|---|---|
| CURRENCY NUMBER | CURRENCY TYPE | CURRENCY VALUE | ACCOUNT NUMBER | LAST DATE/TIME UPDATE |
| 1 | JPY | 500 | 1 | 2020/10/1 03:15:00 |
| 2 | JPY | 500 | 1 | 2020/10/1 03:15:00 |
| 3 | JPY | 500 | 1 | 2020/10/1 03:15:00 |

| CURRENCY INFORMATION | | | | |
|---|---|---|---|---|
| CURRENCY NUMBER | CURRENCY TYPE | CURRENCY VALUE | ACCOUNT NUMBER | LAST DATE/TIME UPDATE |
| 1 | JPY | 500 | 1 | 2020/10/1 03:15:00 |
| 2 | JPY | 500 | 1 | 2020/10/1 03:15:00 |
| 3 | JPY | 500 | 2 | 2020/10/2 09:30:00 |

| TRANSACTION NUMBER | TRANSACTION TYPE | TRANSACTION INFORMATION ||||| ELECTRONIC SIGNATURE |
|---|---|---|---|---|---|---|
| | | REMITTANCE SOURCE ACCOUNT NUMBER | REMITTANCE DESTINATION ACCOUNT NUMBER | AMOUNT OF REMITTANCE | DATE/TIME | |
| 11 | REMITTANCE REQUEST | 1 | 2 | 500 | 2020/10/2 09:30:00 | ELECTRONIC SIGNATURE 1 (ELECTRONIC SIGNATURE BY CRYPTOGRAPHIC KEY OF USER TERMINAL) |
| 12 | ACCOUNT INFORMATION CONFIRMATION REQUEST | 1 | 2 | 500 | 2020/10/2 09:30:00 | ELECTRONIC SIGNATURE 2 (ELECTRONIC SIGNATURE BY CRYPTOGRAPHIC KEY OF TRANSACTION INFORMATION MANAGEMENT DEVICE) |
| 13 | ACCOUNT INFORMATION CONFIRMATION RESPONSE | | | | 2020/10/2 09:30:00 | ELECTRONIC SIGNATURE 3 (ELECTRONIC SIGNATURE BY CRYPTOGRAPHIC KEY OF ACCOUNT INFORMATION MANAGEMENT DEVICE) |
| 14 | CURRENCY INFORMATION CONFIRMATION REQUEST | 1 | 2 | 500 | 2020/10/2 09:30:00 | ELECTRONIC SIGNATURE 4 (ELECTRONIC SIGNATURE BY CRYPTOGRAPHIC KEY OF TRANSACTION INFORMATION MANAGEMENT DEVICE) |
| 15 | CURRENCY INFORMATION CONFIRMATION RESPONSE | | | | 2020/10/2 09:30:00 | ELECTRONIC SIGNATURE 5 (ELECTRONIC SIGNATURE BY CRYPTOGRAPHIC KEY OF CURRENCY INFORMATION MANAGEMENT DEVICE) |
| 16 | REMITTANCE RESPONSE | | | | 2020/10/2 09:30:00 | ELECTRONIC SIGNATURE 6 (ELECTRONIC SIGNATURE BY CRYPTOGRAPHIC KEY OF TRANSACTION INFORMATION MANAGEMENT DEVICE) |

FIG. 2B

| TRANSACTION NUMBER | TRANSACTION TYPE | TRANSACTION INFORMATION ||||| ELECTRONIC SIGNATURE |
|---|---|---|---|---|---|---|
| | | REMITTANCE SOURCE ACCOUNT NUMBER | REMITTANCE DESTINATION ACCOUNT NUMBER | AMOUNT OF REMITTANCE | DATE/TIME | |
| 11 | REMITTANCE REQUEST | 1 | 2 | 500 | 2020/10/2 09:30:00 | ELECTRONIC SIGNATURE 1 (ELECTRONIC SIGNATURE BY CRYPTOGRAPHIC KEY OF USER TERMINAL) |
| 12 | ACCOUNT INFORMATION CONFIRMATION REQUEST | 1 | 2 | 500 | 2020/10/2 09:30:00 | ELECTRONIC SIGNATURE 2 (ELECTRONIC SIGNATURE BY CRYPTOGRAPHIC KEY OF TRANSACTION INFORMATION MANAGEMENT DEVICE) |
| 13 | ACCOUNT INFORMATION CONFIRMATION RESPONSE | | | | 2020/10/2 09:30:00 | ELECTRONIC SIGNATURE 3 (ELECTRONIC SIGNATURE BY CRYPTOGRAPHIC KEY OF ACCOUNT INFORMATION MANAGEMENT DEVICE) #2 |
| 14 | CURRENCY INFORMATION CONFIRMATION REQUEST | 1 | 2 #1 | 500 | 2020/10/2 09:30:00 | ELECTRONIC SIGNATURE 4 (ELECTRONIC SIGNATURE BY CRYPTOGRAPHIC KEY OF TRANSACTION INFORMATION MANAGEMENT DEVICE) #3 |
| 15 | CURRENCY INFORMATION CONFIRMATION RESPONSE | | | | 2020/10/2 09:30:00 | ELECTRONIC SIGNATURE 5 (ELECTRONIC SIGNATURE BY CRYPTOGRAPHIC KEY OF CURRENCY INFORMATION MANAGEMENT DEVICE) |
| 16 | REMITTANCE RESPONSE | | | | 2020/10/2 09:30:00 | ELECTRONIC SIGNATURE 6 (ELECTRONIC SIGNATURE BY CRYPTOGRAPHIC KEY OF TRANSACTION INFORMATION MANAGEMENT DEVICE) |

| ACCOUNT INFORMATION | | | ELECTRONIC SIGNATURE |
|---|---|---|---|
| ACCOUNT NUMBER | BALANCE | LAST DATE/TIME UPDATE | |
| 1 | 1500 | 2020/10/1 03:15:00 | ELECTRONIC SIGNATURE BY CRYPTOGRAPHIC KEY OF ACCOUNT INFORMATION MANAGEMENT DEVICE |
| 2 | 0 | 2020/10/1 00:00:00 | ELECTRONIC SIGNATURE BY CRYPTOGRAPHIC KEY OF ACCOUNT INFORMATION MANAGEMENT DEVICE |

Fig. 5

| CURRENCY INFORMATION | | | | | ELECTRONIC SIGNATURE |
|---|---|---|---|---|---|
| CURRENCY NUMBER | CURRENCY TYPE | CURRENCY VALUE | ACCOUNT NUMBER | LAST DATE/TIME UPDATE | |
| 1 | JPY | 500 | 1 | 2020/10/1 03:15:00 | ELECTRONIC SIGNATURE BY CRYPTOGRAPHIC KEY OF CURRENCY INFORMATION MANAGEMENT DEVICE |
| 2 | JPY | 500 | 1 | 2020/10/1 03:15:00 | ELECTRONIC SIGNATURE BY CRYPTOGRAPHIC KEY OF CURRENCY INFORMATION MANAGEMENT DEVICE |
| 3 | JPY | 500 | 1 | 2020/10/1 03:15:00 | ELECTRONIC SIGNATURE BY CRYPTOGRAPHIC KEY OF CURRENCY INFORMATION MANAGEMENT DEVICE |

Fig. 6

| KEY NUMBER | CRYPTOGRAPHIC KEY | AUTHORITY |
|---|---|---|
| 1 (TRANSACTION INFORMATION MANAGEMENT DEVICE) | 62a6724b3f439ef24571ff01114a2709 | VERIFICATION AND ATTACHMENT |
| 2 (ACCOUNT INFORMATION MANAGEMENT DEVICE) | d0742b450c46f4d2e6c34b12a1cd7a4c | VERIFICATION |
| 3 (CURRENCY INFORMATION MANAGEMENT DEVICE) | b6fad2ee4dcafadd0aa26c6e46b269da | VERIFICATION |
| 4 (USER TERMINAL 210) | 763b7518363ca1addee279e664727dd6 | VERIFICATION |
| 5 (USER TERMINAL 220) | 5159064a48c0670e156439f9f908b660 | VERIFICATION |

CURRENCY MANAGEMENT SYSTEM AND ELECTRONIC SIGNATURE DEVICE

CROSS-REFERENCE TO RELATED APPLICATION

This Application is a continuation of U.S. application Ser. No. 17/922,480 filed on Oct. 31, 2022, which is a PCT National Phase application of PCT/JP2020/044576 filed on Dec. 1, 2020. The entire contents of these applications are hereby incorporated by reference.

TECHNICAL FIELD

The present invention relates to management of currency and electronic signatures.

BACKGROUND

A system for managing currency has been proposed (see PTL1).

CITATION LIST

Patent Literature

[PTL 1] Japanese Patent No. 6316530

SUMMARY

Technical Problem

An object of an embodiment of the present invention is to provide a currency management system that excels in security, and includes legal tender as a management target.

Solution to Problem

The present invention includes a following embodiment.
A currency management system according to the embodiment is a currency management system including a transaction information management device, an account information management device, and a currency information management device, wherein the transaction information management device receives first transaction information from a user terminal; the account information management device receives second transaction information from the transaction information management device; the transaction information management device receives third transaction information from the account information management device; the currency information management device receives fourth transaction information from the transaction information management device, the transaction information management device receives fifth transaction information from the currency information management device; the transaction information management device sends sixth transaction information to the user terminal; the transaction information management device stores in the transaction information management device the first to sixth transaction information; the account information management device receives the first to sixth transaction information from the transaction information management device, and stores in the account information management device the information; and the currency information management device receives the first to sixth transaction information from the transaction information management device, and stores in the currency information management device the information.

Advantageous Effects of Invention

According to an embodiment of the present invention, a currency management system that excels in security and includes legal tender in management targets can be provided.

BRIEF DESCRIPTION OF THE DRAWINGS

FIG. 1F is a diagram for describing a state of storing the transaction information.
FIG. 1G is a diagram for describing a state of updating the account information.
FIG. 2B is a table indicating an example of transaction information to which the electronic signatures are attached.
FIG. 3 is a table indicating an example of transaction information according to Embodiment 3.
FIG. 4 is a table indicating an example of account information to which the electronic signatures are attached.
FIG. 5 is a table indicating an example of currency information to which the electronic signatures are attached.
FIG. 6 is a table indicating a configuration example of an electronic signature device.

DETAILED DESCRIPTION

Currency Management System 100 According to Embodiment 1

Figures 1A, 1B, 1C:
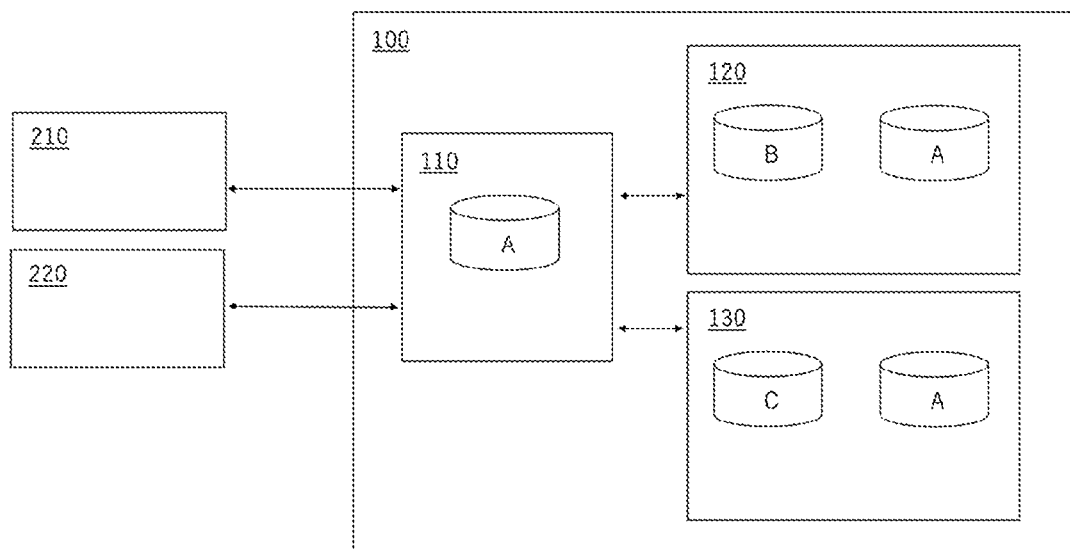
FIG. 1A is a diagram depicting a configuration example of a currency management system according to Embodiment 1.
FIG. 1B is an example of transaction information.
FIG. 1C is an example of account information.

FIG. 1A is a diagram depicting a configuration example of a currency management system 100 according to Embodiment 1. As indicated in FIG. 1A, the currency management system 100 according to Embodiment 1 includes a transaction information management device 110, an account information management device 120 and a currency information management device 130.
(Currency Management System 100)
The currency management system 100 is a system to manage currency. In the present embodiment, a currency number is assigned to all currencies, whereby the currency is managed. The types of currency are not limited. The currency may be legal tender or non-legal tender. The currency may be cryptocurrency or non-cryptocurrency. The currency may be government controlled currency, or may be currency managed by a specific organization, company, and the like. The currency may be points and regional promotion coupons, for example.
(Remittance of Currency)
Currency management includes remittance of currency. In the present embodiment, the remittance of currency is performed by changing the account information B and the currency information C. In the present description, requests and responses that are generated to change the account information B and the currency information C are called "transaction", and the history of transactions is called "transaction information A". The transaction information A can be regarded as a history of requests and responses which were generated to change the account information B and the currency information C.

(Transaction Information Management Device 110)

The transaction information management device 110 is a device to manage the transaction information A. The transaction information management device 110 may be a server device, for example.

(Transaction Information A)

If the transaction information A is used, the correct history of changes of the account information B and the currency information C can be tracked, hence illegal changes of the account information B and the currency information C can be detected, and an illegally changed account information B and currency information C can be recovered to the correct content. However, it is not possible to detect an illegal change of the translation information A using the account information B and the currency information C, and recover the illegally changed transaction information A to the correct content. Therefore in the present embodiment, the transaction information A is stored not only in the transaction information management device 110, but also in the account information management device 120 and the currency information management device 130. Then even in a case where the transaction information A stored in one of the transaction information management device 110, the account information management device 120 and the currency information management device 130 is illegally changed, this illegal state can be detected by using the transaction information A stored in the remaining two devices, and the illegally changed transaction information A can be recovered to the correct content. For example, in a case where the transaction information A stored in the transaction information management device 110 is illegally changed, the transaction information A stored in the transaction information management device 110 can be returned to the correct content using the transaction information A stored in the account information management device 120 and the transaction information A stored in the currency information management device 130. Therefore according to the present embodiment, regardless which one of the transaction information A, the account information B and the currency information C is illegally changed, this illegal state can be detected, and the illegally changed information can be recovered to the correct content. For example, in the case where the account information B stored in the account information management device 120 is illegally changed, the illegally changed account information B can be returned to the correct content using the transaction information A stored in at least one of the transaction information management device 110, the account information management device 120 and the currency information management device 130. Further, as mentioned above, in the case where the transaction information A stored in the transaction information management device 110 is illegally changed, for example, the transaction information A stored in the transaction information management device 110 can be returned to the correct content using the transaction information A stored in the account information management device 120 and the transaction information A stored in the currency information management device 130. Furthermore, in the case where the transaction information A stored in the transaction information management device 110 and the currency information C stored in the currency information management device 130 are illegally changed, the transaction information A stored in the transaction information management device 110 can be returned to the correct content using the transaction information A stored in the account information management device 120 and the transaction information A stored in the currency information management device 130, and the currency information C stored in the currency information management device 130 can be returned to the correct content using at least one of the transaction information A stored in the account information management device 120 and the transaction information A stored in the currency information management device 130 (or the correctly recovered transaction information A stored in the transaction information management device 110). Therefore according to the present embodiment, the currency management system 100 that excels in security and includes legal tender in the management targets can be provided.

FIG. 1B is an example of the transaction information A. As indicated in FIG. 1B, the transaction information A includes, for example, a transaction number, a transaction type, a remittance source account number, a remittance destination account number, an amount of remittance, and a date/time. These data items can be stored associating with each other in a table format, for example. Specifically, these data items can be stored in a same row of the table, each in a different column. These data items are examples, and the transaction information A may include data items other than the above data. The remittance source account number, the remittance destination account number and the amount of remittance may not always be included in the transaction information A. As mentioned above, according to the present embodiment, the transaction information management device 110, the account information management device 120 and the currency information management device 130 store these data items respectively.

<Translation Number>

The transaction number is a number to specify a transaction. The transaction number includes a numeric string and a character string, for example.

<Transaction Type>

The transaction type is a number to specify the type of transaction. The types of transaction include remittance request, account information confirmation request, account information confirmation response, currency information confirmation request, currency information confirmation response and remittance response, for example.

<Remittance Source Account Number>

The remittance source account number is a number to specify the account number of the remittance source. The remittance source account number includes a numeric string and a character string, for example. The remittance source account number is preferably information that can specify the cryptographic key of the user of the remittance source (e.g. key number), in a case where an electronic signature is attached to the transaction information and a secret key cryptosystem is used for the attachment and verification of the electronic signature (in the case where a cryptographic key of a user or a device is shared among each device). In the case where an electronic signature is attached to the transaction information and the public key cryptosystem is used for the attachment and verification of the electronic signature, on the other hand, the remittance source account number is preferably information that can specify the public key of the user of the remittance source.

<Remittance Destination Account Number>

The remittance destination account number is a number to specify the account number of the remittance destination. The remittance destination account number includes a numeric string and a character string, for example. Just like the case of the remittance source account number, the remittance destination account number is preferably information that can specify the cryptographic key of the user of the remittance destination (e.g. key number), or information that can specify the public key of the user of the remittance destination.

<Amount of Remittance>

The amount of remittance is information that specifies the amount to be remitted. The amount of remittance includes a numeric string, for example.

<Date/Time>

The date/time is the date/time when the transaction was generated. The date/time is the time when the transaction information A was sent, for example.

(Account Information Management Device 120)

The account information management device 120 is a device to manage the account information B. The account information management device 120 may be a server device, for example. The account information management device 120 is connected to the transaction information management device 110 via a network, for example. Examples of the network are the Internet and an intranet.

(Account Information B)

The account information B is information to specify the relationship between an account and balance.

FIG. 1C is an example of the account information B. As indicated in FIG. 1C, the account information B includes an account number, a balance and last date/time update. These data items can be stored associated with each other in a table format, for example. Specifically, this data can be stored in a same row of the table, each in a different column. This data is an example, and the account information B may include data items other than the above data items.

<Account Number>

The account number is a number to specify an account. The account number includes a numeric string and a character string, for example.

<Balance>

The balance is information to specify the amount of the currency owned by the account. The balance includes a numeric string, for example.

<Last Date/Time Update>

The last date/time update is the date and time when the account information B was last updated.

(Currency Information Management Device 130)

The currency information management device 130 is a device to manage the currency information C. The currency information management device 130 may be a server device, for example. The currency information management device 130 is connected to the transaction information management device 110 via a network, for example. The currency information management device 130 may or may not be connected to the account information management device 120 via a network, for example. Examples of the network are the Internet and an intranet.

(Currency Information C)

The currency information C is information to manage currency.

Figures 1D, 1E:
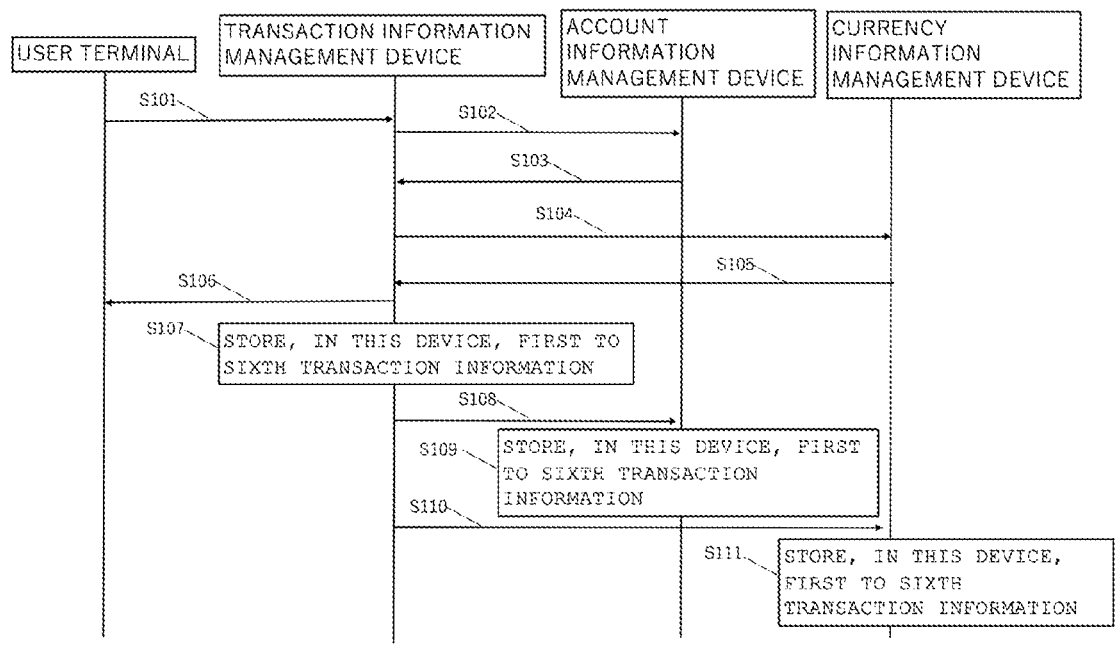
FIG. 1D is an example of currency information.
FIG. 1E is a diagram depicting an operation example of the currency management system according to Embodiment 1.

FIG. 1D is an example of the currency information C. As indicated in FIG. 1D, the currency information C includes a currency number, a currency type, a currency value, an account number and a last date/time update. These data items can be stored associated with each other in a table format, for example. Specifically, these data items can be stored in a same row of the table, each in a different column. These data items are examples, and the currency information C may include data items other than the above data items. Further, the currency value may not be included in the currency information C.

<Currency Number>

The currency number is a number to specify the currency. As mentioned above, a currency number is assigned to all currencies in the present embodiment.

<Currency Type>

Currency type is information to specify the type of currency. The currency type includes Japanese Yen, US Dollar, Euro, Chinese Yuan, and points which have an exchange value in a specific region, company, and the like. In a case of managing only one type of currency, the currency type may not be included in the currency information. In a case where the currency number is information that can specify the currency type (e.g. a case where information to specify the currency type (the Yen) is included in the beginning or end of the currency number as a part of the currency number, such as "Yen1111" or "1111Yen"), the currency type need not be included in the currency information.

<Currency Value>

The currency value is information to specify a value of a currency. For example, it is assumed that two currencies are issued, and currency number 1 is assigned to the first currency, and a currency number 2 is assigned to the second currency. In this case, if Japanese Yen (currency type) and 500 (currency value) are stored in association with the currency number 1, the currency having the currency number 1 has a value of 500 Yen. If US Dollar (currency type) and 100 (currency value) are stored in association with the currency number 2, the currency having the currency number 2 has a value of 100 US Dollars.

<Account Number>

The account number is the account number of the user who owns the currency specified by the currency number. The currency number includes a numeric string and a character string, for example.

<Last Date/Time Update>

The last date/time update is the date/time when the currency information C was updated the last time.

(User Terminals 210 and 220)

A plurality of user terminals 210 and 220 are connected to the transaction information management device 110 via a network, for example. Examples of the user terminals 210 and 220 are a smartphone, a laptop computer and a desktop computer. Examples of a network are the Internet and an intranet.

The transaction information management device 110 functions as an interface with the user terminals 210 and 220. The account information management device 120 and the currency information management device 130 cannot perform the transmission/reception of data with the user terminals 210 and 220 without the transaction information management device 110. The requests from the user terminals 210 and 220 are received by the transaction information management device 110. Based on the requests from the user terminals 210 and 220, the transaction information management device 110 sends the requests to the account information management device 120 and the currency information management device 130. The responses from the account information management device 120 and the currency information management device 130 are received by the transaction information management device 110. Then based on these responses, the transaction information management device 110 sends the responses to the user terminals 210 and 220.

(Operation Example of Currency Management System 100 According to Embodiment 1)

FIG. 1E is a diagram depicting an operation example of the currency management system 100 according to Embodiment 1. The operation example of the currency management system 100 according to Embodiment 1 will now be described with reference to FIG. 1E. In the following example, it is assumed that the account number of a user of the user terminal 210 is 1, and the account number of a user of the user terminal 210 is 2, and 500 Yen is remitted from the account of the account number 1 to the account of the account number 2 in accordance with the remittance request from the user terminal 210.

(Step S101)

First the transaction information management device 110 receives first transaction information a1 from the user terminal 210. The first transaction information a1 is an example of the transaction information A. The first transaction information a1 includes a remittance request and an account issuing request, for example. In the present embodiment, the first transaction information a1 is assumed to be the remittance request.

(Step S102)

Then the account information management device 120 receives the second transaction information A from the transaction information management device 110. The second transaction information a2 is an example of the transaction information A. The second transaction information a2 includes an account information update request and an account information confirmation request, for example. In the case where the second transaction information a2 is the account information update request, the account information management device 120 updates the account information B after receiving the second transaction information a2. Thereby the account information B stored in the account information management device 120 changes from the data before update to the data after update, for example, as indicated in FIG. 1G. In the case where the second transaction information a2 is the account information confirmation request, the account information management device 120 confirms the account information B after receiving the second transaction information a2, and confirms whether the balance not less than the amount of remittance is held in the account, for example.

(Step S103)

Then the transaction information management device 110 receives the third transaction information a3 from the account information management device 120. The third transaction information a3 is an example of the transaction information A. The third transaction information a3 includes an account information update response and an account information confirmation response, for example. The account information update response is a response to indicate whether the account information was correctly updated, for example. The account information confirmation response is a response to indicate a confirmation result that indicates whether a balance not less than the amount of remittance is held in the account.

(Step S104)

Figure 1H:
FIG. 1H is a diagram for describing a state of updating the currency information.

Then the currency information management device 130 receives the fourth transaction information a4 from the transaction information management device 110. The fourth transaction information a4 is an example of the transaction information A. The fourth transaction information a4 is a currency information update request or a currency information confirmation request, for example. In the case where the fourth transaction information a4 is the currency information update request, the currency information management device 130 updates the currency information C after receiving the fourth transaction information a4. Thereby the currency information C stored in the currency information management device 130 changes from the data before update to the data after the update, for example, as indicated in FIG. 1H. In the case where the fourth transaction information a4 is the currency information confirmation request, the currency information management device 130 confirms the currency information C after receiving the fourth transaction information a4, and confirms whether the currency associated with the account number of the user of the remittance source exists, for example.

(Step S105)

Then the transaction information management device 110 receives the fifth transaction information a5 from the currency information management device 130. The fifth transaction information a5 is an example of the transaction information A. The fifth transaction information a5 includes a currency information update response and a currency information confirmation response, for example. The currency information update response is a response to indicate whether the currency information was correctly updated, for example. The currency information confirmation response is a response to indicate a confirmation result that indicates whether the currency associated with the account number of the user at the remittance source exists, for example.

(Step S106)

Then the transaction information management device 110 sends the sixth transaction information a6 to the user terminal 210. The sixth transaction information a6 is an example of the transaction information A. The sixth transaction information a6 includes a remittance response and an account issuing response. In the present embodiment, the sixth transaction information a6 is assumed to be the remittance response. The remittance response is a response to indicate whether the remittance was performed correctly, for example.

(Step S107)

Then the transaction information management device 110 stores in the transaction information management device 110 the first to sixth transaction information. Thereby the transaction information A stored in the transaction information management device 110 changes from the data before storing to the data after storing, as indicated in FIG. 1F, for example.

(Steps S108 and S109)

Then the account information management device 120 receives the first to sixth transaction information from the transaction information management device 110, and stores in the account information management device 120 this data. Thereby the transaction information A stored in the account information management device 120 changes from the data before storing to the data after storing, as indicated in FIG. 1F, for example.

In the case where confirmation of the account information B, instead of the update of the account information B, is executed after step S102, the account information management device 120 updates the account information B after receiving the first to sixth transaction information from the transaction information management device 110. Thereby the account information B stored in the account information management device 120 changes from the data before update to the data after update, as indicated in FIG. 1G, for example.

(Steps S110 and S111)

Then the currency information management device 130 receives the first to sixth transaction information from the transaction information management device 110, and stores in the currency information management device 130 this data. Thereby the transaction information A stored in the currency information management device 130 changes from the data before storing to the data after storing, as indicated in FIG. 1H, for example.

In the case where confirmation of the currency information C, instead of the update of the currency information C, is executed after step S104, the currency information management device 130 updates the currency information C after receiving the first to sixth transaction information from the transaction information management device 110. Thereby the currency information C stored in the currency information management device 130 changes from the data before update to the data after update, as indicated in FIG. 1H, for example.

In the present embodiment, it is assumed that the transaction information A is stored in the sequence of the transaction information management device 110 (step S107), the account information management device 120 (step S108), and the currency information management device 130 (step S110), however the sequence of storing the transaction information A (the sequence of steps S107, S108 and S110) may be changed.

As described above, if the transaction information A is used, the correct history of changes of the account information B and the currency information C can be tracked, hence illegal changes of the account information B and the currency information C can be detected, and an illegally changed account information B and currency information C can be recovered to the correct content. However, it is not possible to detect an illegal change of the transaction information A and recover the illegally changed transaction information A using the account information B and the currency information C, to the correct content. Therefore in the present embodiment, the transaction information A is stored not only in the transaction information management device 110, but also in the account information management device 120 and the currency information management device 130. Then even in a case where the transaction information A stored in one of the transaction information management device 110, the account information management device 120 and the currency information management device 130 is illegally changed, this illegal state can be detected by using the transaction information A stored in the remaining two devices, and the illegally changed transaction information A can be recovered to the correct content. For example, in a case where the transaction information A stored in the transaction information management device 110 is illegally changed, the transaction information A stored in the transaction information management device 110 can be returned to the correct content using the transaction information A stored in the account information management device 120 and the transaction information A stored in the currency information management device 130. Therefore according to the present embodiment, regardless which one of the transaction information A, the account information B and the currency information C is illegally changed, this illegal state can be detected, and the illegally changed information can be recovered to the correct content. For example, in the case where the account information B stored in the account information management device 120 is illegally changed, the illegally changed account information B can be returned to the correct content using the transaction information A stored in at least one of the transaction information management device 110, the account information management device 120 and the currency information management device 130 respectively. Further, as mentioned above, in the case where the transaction information A stored in the transaction information management device 110 is illegally changed, for example, the transaction information A stored in the transaction information management device 110 can be returned to the correct content using the transaction information A stored in the account information management device 120 and the transaction information A stored in the currency information management device 130. Furthermore, in the case where the transaction information A stored in the transaction information management device 110 and the currency information C stored in the currency information management device 130 are illegally changed, the transaction information A stored in the transaction information management device 110 can be returned to the correct content using the transaction information A stored in the account information management device 120 and the transaction information A stored in the currency information management device 130, and the currency information C stored in the currency information management device 130 can be returned to the correct content using at least one of the transaction information A stored in the account information management device 120 and the transaction information A stored in the currency information management device 130 (or the correctly recovered transaction information A stored in the transaction information management device 110). Therefore according to the present embodiment, the currency management device 100 that excels in security and includes legal tender in the management targets can be provided.

Currency Management System 400 According to Embodiment 2

Figure 2A:
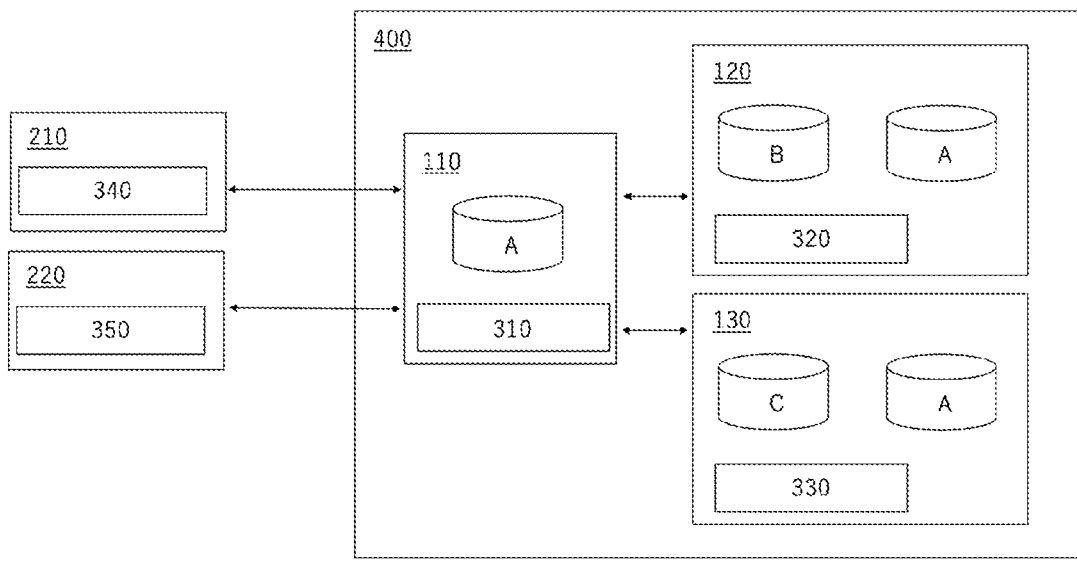
FIG. 2A is a diagram depicting a configuration example of a currency management system according to Embodiment 2.

FIG. 2A is a diagram depicting a configuration example of a currency management system 400 according to Embodiment 2. As indicated in FIG. 2A, in the currency management system 400 according to Embodiment 2, each of the transaction information management device 110, the account information management device 120 and the currency information management device 130 includes an electronic signature device 310 to 330 respectively. The user terminals 210 and 220 also include electronic signature devices 340 and 350 respectively. In Embodiment 2, the electronic signatures created using these electronic signature devices 310 to 350 are attached to the transaction information A, which is different from Embodiment 1. The electronic signature may be a hash value which is calculated using a hash function, for example. It is preferable that the electronic signature devices 310 to 350 have tamper resistance.

In the case of attaching an electronic signature to the transaction information A, it can be detected whether the transaction information A has been illegally changed or not by verifying the electronic signature attached to the transaction information A. Therefore even if transaction information A is illegally changed in the two devices, out of the transaction information management device 110, the account information management device 120 and the currency information management device 130, the illegally changed transaction information A in the two devices can be recovered using the transaction information A in the remaining one device. For example, it is assumed that the transaction information A is illegally changed in the transaction information management device 110 and the account information management device 120. In this case, in the transaction information management device 110 and the account information management device 120, the illegal change can be detected by verifying the electronic signatures assigned to the respective transaction information A. For the transaction information A stored in the currency information management device 130, on the other hand, it can be determined that an illegal change has not been performed, based on verification of the electronic signature attached to this transaction information A. Therefore, using the transaction information A stored in the currency information management device 130, the transaction information A stored in the transaction information management device 110 and in the account information management device 120 can be recovered to the correct content.

Electronic signature devices 310 to 350 are devices to execute the creation and verification of an electronic signature. The methods for creating and verifying an electronic signature are not especially limited. These methods can be implemented by a public key cryptosystem, but can also be implemented by a secret key cryptosystem. In Embodiment 2, it is assumed that a public key cryptosystem is used.

FIG. 2B is a table indicating an example of the transaction information A to which electronic signatures are attached. In the present embodiment, as indicated in FIG. 2B, an electronic signature is attached to each transaction information A. An n-th electronic signature is attached to the n-th transaction information A. Here n is 1 or greater integer. The electronic signature attached to each transaction information A is created using a cryptographic key of a device that sends each of the transaction information A. For example, the electronic signature attached to the above mentioned first transaction information a1 is created using a cryptographic key of the user terminal 210. The electronic signatures attached to the second, fourth and sixth transaction information a2, a4 and a6 are created using a cryptographic key of the transaction information management device 110. The electronic signature attached to the third transaction information a3 is created using a cryptographic key of the account information management device 120. The electronic signature attached to the fifth transaction information a5 is created using a cryptographic key of the currency information management device 130. The cryptographic key of the user terminal 210 may be a cryptographic key of the user to operate or to own the user terminal 210, for example. The cryptographic key of each device may be a cryptographic key of an operator of the present embodiment to own or assign for each device, for example.

According to the present embodiment, as described above, even if transaction information A is illegally changed in two devices out of the transaction information management device 110, the account information management device 120 and the currency information management device 130, the illegally changed transaction information A in two devices can be recovered using the transaction information A in the remaining one device. Therefore only if the content of the transaction information A stored in at least one device is intact, all the information can be recovered to the correct content including the account information B and the currency information C. For example, it is assumed that all the information, other than the transaction information A stored in the transaction information management device 110, was illegally changed, that is, it is assumed that the account information B and the transaction information A stored in the account information management device 120, and the currency information C and the transaction information A stored in the currency information management device 130 were illegally changed. Even in such a case, using the electronic signature attached to the transaction information A, it can be determined that the transaction information A stored in the transaction information management device 110 has correct content, and the transaction information A stored in the account information management device 120 and the currency information management device 130 have been illegally changed. Therefore using the transaction information A stored in the transaction information management device 110, the transaction information A stored in the remaining two devices can be returned to the correct content. Further, using the transaction information A stored in the transaction information management device 110 (or additionally using the correctly recovered transaction information A stored in the account information management device 120 and the currency information management device 130), it can be detected that the account information B stored in the account information management device 120 and the currency information C stored in the currency information management device 130 have been illegally changed. Then using the transaction information A stored in the transaction information management device 110 (or additional using correctly recovered transaction information A stored in the account information management device 120 and the currency information management device 130), the account information B stored in the account information management device 120 and the currency information C stored in the currency information management device 130 can be returned to the correct content.

Currency Management System According to Embodiment 3

In a currency management system according to Embodiment 3, the n-th electronic signature is created using the n-th transaction information A and the (n−1)th electronic signature, which is different from the currency management system 100 according to Embodiment 2. Further, in the currency management system according to Embodiment 3, the n-th electronic signature attached to the n-th transaction information A is verified by comparing the electronic signature created using the n-th transaction information A and the (n−1)th electronic signature with the n-th electronic signature, which is different from the currency management system according to Embodiment 2. Here "n−1" means n minus 1, that is, a number that is smaller than n by 1. In Embodiment 3, the third electronic signature attached to the third transaction information a3 can be created using the third transaction information a3 and the second electronic signature, for example. Further, the third electronic signature attached to the third transaction information a3 can be verified by comparing the electronic signature, which is created using the third transaction information a3 and the second electronic signature, with the third electronic signature attached to the third transaction information a3, for example.

According to the present embodiment, the fourth electronic signature (#3) is created using the fourth transaction information a4 (#1) and the third electronic signature (#2), as indicated in FIG. 3. For example, the fourth electronic signature (#3) can be created by performing a predetermined arithmetic operation using the fourth transaction information a4 (#1), the third electronic signature (#2) and the cryptographic key of the transaction information management device 110. Further, the fourth electronic signature (#3) can be verified using the fourth transaction information a4 (#1) and the third electronic signature (#2). For example, an electronic signature for verification is created by performing a predetermined arithmetic operation using the fourth transaction information (#1), the third electronic signature (#2) and the cryptographic key of the transaction information management device 110, and it is determined that a correct electronic signature has been attached to the fourth transaction information a4 if this signature for verification matches with the fourth electronic signature (#3) attached to the fourth transaction information a4. The predetermined arithmetic operation may be a calculation using a hash function, for example.

The 0-th electronic signature is assumed to be a value that is predetermined as an initial value.

According to the present embodiment, the (n−1)th electronic signature must be changed to change the n-th electronic signature, and the (n−2)th electronic signature must be changed to change the (n−1)th electronic signature, and this relationship continues up to the first electronic signature, hence the n-th electronic signature cannot be changed unless the first electronic signature is changed. Therefore the probability of an illegal change of the transaction information A can be decreased.

In the case of the present embodiment, the (n−1)th electronic signature is required to verify the n-th electronic signature. Therefore in the above mentioned example indicated in FIG. 1E, it is preferable that the information that can specify the first electronic signature, such as the first transaction information a1 to which the first electronic signature is attached, is sent along with the second transaction information a2. Then the account information management device 120 can quickly use the first electronic signature that is required to verify the second electronic signature.

In the same manner, in the present embodiment, it is preferable that the information that can specify the third electronic signature, such as the third transaction information a3 to which the third electronic signature is attached, is sent along with the fourth transaction information a4. Then the currency information management device 130 can quickly use the third electronic signature that is required to verify the fourth electronic signature.

In the same manner, in the present embodiment, it is preferable that the information that can specify the fifth electronic signature, such as the fifth transaction information a5 to which the fifth electronic signature is attached, is sent along with the sixth transaction information a6. Then the user terminal 210 can quickly use the fifth electronic signature that is required to verify the sixth electronic signature.

The 0-th electronic signature is required to verify the first electronic signature, but the 0-th electronic signature is an initial value. Therefore if the transaction information management device 110 stores this value in advance, the transaction information management device 110 can quickly use the 0-th electronic signature that is required to verify the first electronic signature, even if the information that can specify the 0-th electronic signature is not sent along with the first transaction information.

Further, the second electronic signature is required to verify the third electronic signature, but the second electronic signature is an electronic signature attached by the transaction information management device 110. Therefore if the transaction information management device 110 creates the second electronic signature and stores in the transaction information management device 110 this signature, the transaction information management device 110 can quickly use the second electronic signature that is required to verify the third electronic signature, even if the information that can specify the second electronic signature (e.g. second transaction information a2) is not sent along with the third transaction information.

Furthermore, the fourth electronic signature is required to verify the fifth electronic signature, but the fourth electronic signature is an electronic signature attached by the transaction information management device 110. Therefore if the transaction information management device 110 creates the fourth electronic signature and stores in the transaction information management device 110 this signature, the transaction information management device 110 can quickly use the fourth electronic signature that is required to verify the fifth electronic signature, even if the information that can specify the fourth electronic signature (e.g. fourth transaction information a4) is not sent along with the fifth transaction information.

Currency Management System According to Embodiment 4

FIG. 4 is a table indicating an example of account information B to which electronic signatures are attached. As indicated in FIG. 4, in the currency management system according to Embodiment 4, electronic signatures are attached to the account information B, which is different from the currency management system 100 according to Embodiment 1. Each electronic signature attached to the account information B can be created using the account information B to which the electronic signature is attached and a cryptographic key of the account information management device 120. For example, in the case of the account information B that is specified by an account number 2, the electronic signature that is attached to the account information B specified by the account number 2 can be calculated by performing a predetermined arithmetic operation using the account information B specified by the account number 2 and the cryptographic key of the account information management device 120. The predetermined arithmetic operation may be a calculation using a hash function, for example.

As mentioned above, an illegal change of the account information B can be detected and recovered using the transaction information A. However, in the case of detecting the illegal change using the transaction information A, the change history of the account information B must be checked from the first transaction information A. For example, if the first transaction information to the $100^{th}$ transaction information exist, it must be checked whether the account information B was correctly changed or not sequentially from the first transaction information. Therefore in the case where many transactions were performed, such as the case where currency was remitted many times, an enormous volume of processing is required to determine whether the account information B was illegally changed or not, which may delay detection of an illegal change. Further, if an enormous volume of processing is required to detect an illegal change, it becomes difficult to frequently execute illegal change detection processing for the account information B using the transaction information A. Therefore in the present embodiment, an electronic signature is attached to the account information B. Then it can be detected whether the account information B was illegally changed or not by verifying the electronic signature attached to the account information B, even if the transaction information A is not used, hence if the account information B was illegally changed, this illegal change can be quickly detected. After the illegal change is detected, the account information B can be recovered to the correct content using the transaction information A.

Currency Management System According to Embodiment 5

FIG. 5 is a table indicating an example of the currency information C to which electronic signatures are attached. As indicated in FIG. 5, in the currency management system according to Embodiment 5, electronic signatures are attached to the currency information C, which is different from the currency management system 100 according to Embodiment 1. Each electronic signature attached to the currency information C can be created using the currency information C to which the electronic signature is attached and a cryptographic key of the currency information management device 130. For example, in the case of the currency information C that is specified by a currency number 3, the electronic signature that is attached to the currency information C specified by the currency number 3 can be calculated by performing a predetermined arithmetic operation using the currency information C specified by the currency number 3 and the cryptographic key of the currency information management device 130. The predetermined arithmetic operation may be a calculation using a hash function, for example.

According to the present embodiment, just like the case of attaching the electronic signature to the account information B described in Embodiment 4, an illegal change of the currency information C can be quickly detected without using the transaction information A, and if an illegal change of the currency information C is detected, the currency information C can be recovered to the correct content using the transaction information A.

Currency Management System According to Embodiment 6

FIG. 6 is a table indicating a configuration example of an electronic signature device 310. As indicated in FIG. 6, it is preferable that the electronic signature device 310 can store the cryptographic key in association with authority, and execute only the processing type corresponding to the authority, out of the processing types using the cryptographic key. Electronic signature devices 320 to 350 can be constructed in the same manner as the electronic signature device 310, except that the content of the authority is different. In Embodiment 2, it is assumed that the electronic signature devices 310 to 350 create and verify the electronic signatures based on a public key cryptosystem. However, in the case of the public key cryptosystem, a public key and a secret key are used, and the public key is very long (e.g. 2048 bits). In the case of the secret key cryptosystem, on the other hand, encryption and verification are performed using a secret key (e.g. 256 bits). In other words, in the case of the secret key cryptosystem, a long public key is unnecessary, and the time for creating, attaching and verifying the electronic signature can be decreased. A downside of using the secret key cryptosystem, however, is that the cryptographic key (secret key) must be shared by a plurality of electronic signature devices. This means that even an electronic signature device, which performs only the verification of an electronic signature created using a certain cryptographic key, could create the electronic signature using this cryptographic key, which is a security problem. For example, in the above example, the transaction information management device 110 owns not only the cryptographic key of the transaction information management device 110, but also the cryptographic keys of the user terminals 210 and 220, the account information management device 120, and the currency information management device 130. Here in the transaction information management device 110, the cryptographic keys of the user terminals 210 and 220, the account information management device 120, and the currency information management device 130 are used only for the verification of electronic signatures. Nonetheless, the transaction information management device 110 could create an electronic signature using the cryptographic keys of the user terminals 210 and 220, the account information management device 120, and the currency information management device 130. In other words, the transaction information management device 110 could be disguised as the user terminals 210 and 220, the account information management device 120 or the currency information management device 130. Therefore in the present embodiment, the electronic signature devices 310 to 350 use the secret key cryptosystem, and the electronic signature devices 310 to 350 share the cryptographic keys (secret keys). However, in the present embodiment, authority is assigned to each of the plurality of cryptographic keys (secret keys) that are shared, to prevent security problems, such that in the electronic signature devices 310 to 350 each of the plurality of cryptographic keys (secret keys) that are shared can be used only for processing corresponding to the assigned authority. In this way the time required for creating, attaching and verifying the electronic signatures can be decreased, while ensuring security. For example, as indicated in FIG. 6, the electronic signature device 310 of the transaction information management device 110 has not only the cryptographic key of the transaction information management device 110, but also the cryptographic keys of the user terminals 210 and 220, the account information management device 120, and the currency information management device 130. However, the cryptographic key of the transaction information management device 110 has an authority of attachment and verification, and the cryptographic keys of the other devices have only the authority of verification. Then the electronic signature device 310 of the transaction information management device 110 can execute creation, attachment and verification of an electronic signature using the cryptographic key of the transaction information management device 110, but can execute only verification of an electronic signature using the cryptographic keys of the other devices. The electronic signature device described in the present embodiment, that is, an electronic signature device that stores the cryptographic key in association with authority and, out of the processing types using the cryptographic key (e.g. creation and verification of electronic signature), executes only the processing type corresponding to the authority (for example, an electronic signature device, of which authority that is stored in association with the cryptographic key E is only for the verification of an electronic signature, can execute verification of an electronic signature using this cryptographic key E, but cannot execute the creation of an electronic signature using this cryptographic key E. An electronic signature device, of which authority that is stored in association with the cryptographic key E is for creation and verification of an electronic signature, on the other hand, can execute both the creation and verification of an electronic signature using this cryptographic key E.) can be favorably used for the electronic signature devices 310 to 350 of the transaction information management device 110, the account information management device 120, the currency information management device 130 and the user terminals 210 and 220 respectively. However, this electronic signature device is not limited to the use of the system for managing currency, but may be widely used for various devices and systems that use secret key cryptosystems, other than the devices and systems described above.

Embodiments of the present invention have been described, but the present invention is in no way limited by the above description.

REFERENCE SIGNS LIST 100, 400 Currency management system
110 Transaction information management device
120 Account information management device
130 Currency information management device
210 User terminal
220 User terminal
310 to 350 Electronic signature device
A Transaction information
B Account information
C Currency information

The invention claimed is:

1. A secret key type electronic signature device, comprising:
at least one processor configured to:
store, in at least one storage, a cryptographic key and a first authority assigned to the cryptographic key;
share the cryptographic key with another electronic signature device;
wherein the other electronic signature device comprises at least one processor and at least one storage, wherein the at least one processor of the other electronic signature device is configured to store, in the at least one storage of the other electronic signature device, the shared cryptographic key and a second authority assigned to the shared cryptographic key that is different from the first authority stored in the secret key type electronic signature device,
wherein the second authority stored in the other electronic signature device is only for verification of an electronic signature, and the at least one processor of the other electronic signature device is configured to perform verification of the electronic signature using the shared cryptographic key, but cannot perform creation of the electronic signature using the shared cryptographic key, and
wherein the first authority that is stored in the secret key type electronic signature device is configured for creation and verification of the electronic signature;
wherein the at least one processor of the secret key type electronic signature device is further configured to:
perform creation of a first electronic signature using the shared cryptographic key stored in the secret key type electronic signature device according to the first authority assigned to the shared cryptographic key stored in the secret key type electronic signature device that authorizes the creation, and as a result, attach the created first electronic signature to a piece of information;
wherein the at least one processor of the other electronic signature device is further configured to:
perform verification of the first electronic signature attached to the piece of information using the shared cryptographic key stored in the other electronic signature device according to the second authority assigned to the shared cryptographic key stored in the other electronic signature device that authorizes the verification, and, as a result, determine whether the piece of information to which the first electronic signature is attached has been illegally changed based on the result of the verification; and
not perform creation of the first electronic signature using the shared cryptographic key stored in the other electronic signature device according to the second authority assigned to the shared cryptographic key stored in the other electronic signature device that does not authorize the creation, and, as a result, not attach the first electronic signature to the piece of information.

2. A secret key type electronic signature device, comprising:
at least one memory storing a cryptographic key in association with a first authority and a second authority which are assigned to the cryptographic key, wherein the first authority is different from the second authority and the second authority is only for verification of an electronic signature; and
at least one processor configured to:
share the cryptographic key with another electronic signature device;
wherein the other electronic signature device comprises at least one processor and at least one storage, and the at least one processor of the other electronic signature device is configured to store, in the at least one storage of the other electronic signature device, the shared cryptographic key and the second authority assigned to the shared cryptographic key,
wherein the at least one processor of the other electronic signature device is configured to perform verification of the electronic signature using the shared cryptographic key, but cannot perform creation of the electronic signature using the shared cryptographic key, and
wherein the first authority and the second authority both stored in the memory of the secret key type electronic signature device are configured for creation and verification of the electronic signature;
wherein the at least one processor of the secret key type electronic signature device is further configured to:
perform creation of a first electronic signature using the shared cryptographic key stored in the secret key type electronic signature device according to the first authority assigned to the shared cryptographic key stored in the secret key type electronic signature device that authorizes the creation, and as a result, attach the created first electronic signature to a piece of information;
wherein the at least one processor of the other electronic signature device is further configured to:
perform verification of the first electronic signature attached to the piece of information using the shared cryptographic key stored in the other electronic signature device according to the second authority assigned to the shared cryptographic key stored in the other electronic signature device that authorizes the verification, and, as a result, determine whether the piece of information to which the first electronic signature is attached has been illegally changed based on the result of the verification; and
not perform creation of the first electronic signature using the shared cryptographic key stored in the other electronic signature device according to the second authority assigned to the shared cryptographic key stored in the other electronic signature device that does not authorize the creation, and, as a result, not attach the first electronic signature to the piece of information.

\* \* \* \* \*